March 29, 1955 P. PASCHEN 2,705,105
APPARATUS FOR THE CODED REPRESENTATION
OF MEASURING VALUES
Filed April 16, 1952 5 Sheets-Sheet 1

Inventor:
Paul Paschen

United States Patent Office 2,705,105
Patented Mar. 29, 1955

2,705,105

APPARATUS FOR THE CODED REPRESENTATION OF MEASURING VALUES

Paul Paschen, Nurnberg, Germany, assignor to Siemens-Schuckertwerke Aktiengesellschaft, Berlin - Siemensstadt, Germany, a German corporation Application April 16, 1952, Serial No. 282,535

Claims priority, application Germany April 16, 1951

15 Claims. (Cl. 235—58)

My invention relates to methods and apparatus for producing and reproducing a record of measuring quantities and the like numerical values with the aid of denominational marks placed upon or punched into a recording tape or sheet.

It is the general object of my invention to jointly satisfy the seemingly incompatible desiderata of permitting the measuring values to be recorded and reproduced by apparatus of a simple and compact design, and to nevertheless present the value-denoting marks in form of legible notations.

To this end, and in accordance with a feature of my invention, I translate a plural-digit decimal value, indicative of a measuring result or other physical quantity, into a code in which each individual decimal digit is separately represented by a multi-position order of less than ten denominational positions, particularly with only four such positions. More specifically, I enter the record of a decimal number upon a record sheet or tape by subdividing the record area into a series of zones or sections, one for each decimal digit, and punching or otherwise marking in each zone one or several of a group of denominational places corresponding to the multi-position order into which the value of that particular decimal digit is to be translated.

According to another one of the more specific features of my invention, I prefer applying to each decimal digit or zone a four-position binary system, thus denoting each measuring value by a mixed decimal-binary code, without disturbing the decimal system as regards the relation of the individual decimal digits to each other. Accordingly, four distinct recording positions are assigned to each individual decimal digit on the record-receiving area, each position to be provided with or without a punch hole or other mark depending upon the numerical value to be represented ("black and white" notation). The last one of these four marking positions on the tape or sheet corresponds to unity, i. e. to the noughth power ($2^0$) of the number 2. The preceding marking position corresponds to the first power ($2^1$) of the number 2 i. e. to the value two. The next position denotes the second power ($2^2$) of 2 and hence to the number 4. The remaining marking position corresponds to the third power ($2^3$) of 2 and hence to the number 8. In this manner, the numbers 0 to 9 can be represented for each decimal digit. As will be seen, such a mixed decimal-binary record is readily legible.

The following example may elucidate the foregoing.

If the distribution network of an electric power supply system has several feed points connected to power stations or other networks, and if, as is usually the case, the exchanged electric power is to be assessed not only in accordance with the indications of electric meters but also on the basis of the maximum active, reactive or apparent power consumption or demand, then the total consumption and the periodic consumption may be measured and recorded in a central totalizing station connected by measuring lines with the remote meters at the network and power-station junction points. The installation of the connecting lines between the central measuring station and the remotely located meters, however, becomes difficult if large distances are involved. In such cases the remedy may be resorted to of having the individual meter indications and the periodically recorded indications read-off or produced at the localities of the respective instruments, to be thereafter jointly evaluated in a central office. Of particular concern in this respect are the periodically recorded indications, for instance, as conventionally produced in writing or printing maximum meters.

With the known saw-tooth writing recorders, any maximum indication is optically easily discernible from the record. However, it is not readily apparent whether or not such a maximum of an individual item coincides with a maximum of the entire network, i. e. with the periodic sum of power consumption. To obtain this information the ordinate values corresponding to the same periods of time on all record tapes must be added; but this involves rather intricate work which cannot be readily performed by the customary automatic computing devices. On the other hand, if the periodic values are recorded by printing, then it is difficult to locate a maximum even on an individual record tape; and this well overshadows the advantage that, for determining the sum maximum, the figures printed on the individual records can be more easily and more accurately added than when ordinate values, as in the curve-writing meters, are involved. A simultaneous recording by curve-writing instruments as well as by figure-printing recorders fails to overcome these difficulties and results in excessively complicated devices if an automatic evaluation of the records is intended.

It has therefore been suggested to punch or otherwise mark the periodically recorded measuring values onto cards or tapes, for instance in a binary numerical system. Compared with the decimal system, the binary system has the advantage of requiring a minimum of marking places so that, for instance on a punched record, a smaller number of holes is sufficient. Hence, the marking and reproducing devices are correspondingly small and simple. An essential deficiency of the binary system, however, lies in the fact that the evaluation, requiring a retranslation into the decimal system, is a difficult matter especially if many measuring results are to be totalized. Besides, the customary calculating machines, designed for the decimal system, cannot be used for the binary system. Furthermore, multi-position binary figures of high values are difficult to read.

Relating to the foregoing example, it is a more specific aim of my invention to avoid the above-mentioned difficulties and yet to permit the recording of measuring values with a minimum of marking places, particularly punch hole positions, closely approaching the theoretical minimum afforded by the binary system.

While, as mentioned this result is achieved by a mixed system in which each decimal digit is marked by a multi-position system, preferably a binary four-position system, in which the presence or absence of a mark (black and white method) on each available position is indicative of the recorded value, a five-variant code within each decimal digit may also be used to advantage. A five-variant code has been employed, for instance, in teletypewriters where, depending upon whether one or more holes are punched into an individual code-unit area of a paper tape, the hole combination denotes one or another character. A five-unit code, therefore, may similarly be used for denoting the ten numbers of each individual decimal digit in apparatus according to my invention. This has the advantage that the now available components and subassemblies of teletypewriters may be used in such apparatus. However, a larger number of punch hole places are then necessary than when applying a four-position system for each decimal digit.

Instead of punching the marks into a paper tape, they may be printed, for instance for use with photoelectric feeler devices, or they may be electrically burned out of a thin metal coat on a tape of paper or other insulating material.

The foregoing and other objects, advantages and features of my invention will be apparent, or will be set forth, in conjunction with the following description of the embodiments shown on the drawings, in which.

Figure 1:
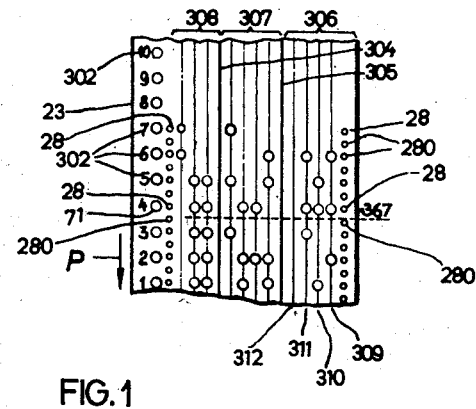
Fig. 1 shows a tape with punched entries denoting several value notations according to the invention.

The recording tape 23 according to Fig. 1 has a series of hour-denoting numbers 302 printed on its left-hand margin, each of these numbers being placed next to one of an evenly spaced column of transport holes 71. The tape surface is longitudinally subdivided by two heavy lines 304, 305 into three strip zones 306, 307, 308.

The zone 306 is imprinted with four lines 309 to 312. Four similar lines are imprinted in zone 307, while only three such lines are printed in zone 308. The lines 309 to 312 correspond to the individual positions of a four-position binary number system. This applies also to the four lines of zone 307, while the zone 308 is designed for a three-position binary system. The zone 306, in totality, corresponds to the unit digit of a decimal system. Zone 307, in totality, corresponds to the tens digit and 308 to the hundred digit of the decimal system.

Consequently, the tape is punched in the following manner, for instance, for the decimal number "367" which is represented by the value-denoting horizontal line of punched holes identified in Fig. 1 by a broken line. A punched hole on line 309 denotes the value 1. A hole on line 310 denotes the value 2. A hole on line 311 denotes the value 4. There is no hole on line 312 of zone 306. Consequently, the sum of the values denoted by the three punched holes in the unit zone 306 of the tape amounts to 1+2+4=7. That is, the three holes punched into zone 306 denote together the unit value 7 of the decimal number "367." The figure 6 of the tens digit of the same number appears in zone 307 as two punched holes denoting the values 2 and 4 respectively. Analogously, the figure 3 of the decimal hundreds digit is entered in zone 304 as two holes denoting 1 and 2 respectively. With only moderate practice, the values represented by the punched holes can readily be read off the tape.

The highest number that can be punched is "799." The total number of variation possibilities of the four-position binary system (the number 15 could be represented in each zone) is not fully utilized with a tape of the illustrated design. However, a three-position binary system would permit expressing only the number 7 for each decimal digit. As a rule, therefore, the three-position binary system is unsuitable for representing the individual digits of a complete decimal system. Only in the zone 308 for the highest decimal digit is such a three-position binary system applicable if, as here assumed, the largest value of the highest digit does not exceed the value 7. For higher digit values a four-position binary system would have to be also applied to the zone 308; and if still higher decimal digits are required, one or more additional zones for respective binary notations would have to be added at the left of the tape area shown in Fig. 1.

It is a characteristic advantage of the invention that only eleven marking or punching places are sufficient for representing all numbers up to the maximum of 799. In contrast thereto the conventional decimal system would require nine punchings, twice repeated, plus seven punchings, thus amounting to a total of twenty-five hole positions for denoting the same number 799. When applying a pure binary system, the representation of the same number would require only one hole position less than with the embodiment according to Fig. 1. Such pure binary numbers, however, can hardly be decoded without particular skill or auxiliary devices, aside from the fact that complicated apparatus are required for translating the notations into the decimal system.

It will therefore be recognized that the application of the combined decimal-binary system according to the invention permits a close approach to the imaginable minimum of hole positions without relinquishing the desire for legibility. The reduction in the number of hole positions achieved in comparison with the conventional systems, also results in a corresponding simplification in the design of the tape marking and retranslating devices as well as to correspondingly minimized space requirements of such devices.

It may be mentioned that the four positions of each zone need not necessarily be graduated in accordance with the binary system although this particular system offers particular advantages. Applicable, for instance, are also such other systems or series of variants as the customary graduation series of weights or coins, or the series 4, 3, 2, 1 or 5, 3, 1, 1, and the like.

In the illustrated example, the punching of each complete value notations, for instance "367," is accompanied by the punching of a guide hole 28 on each margin of the tape. After the punching of an individual value notation, a counting mechanism which controls the punching operation and is advanced, for instance, by measuring pulses, is returned to its zero position before a new punching operation is started. This will be explained in a later place. Thereafter, the tape is advanced one step in the direction of the arrow P. Thereupon the zero position of the counting mechanism is punched into the tape for checking purposes. This punching operation is also accompanied by the punching of guide holes 280. The indication on the tape of the zero position is desirable in order to make certain that with a periodic recording operation each recorded value is counted from zero. If, occasionally the zero position is not reached during the return movement of the counting mechanism, then the residual value of the counting mechanism is punched into the tape and the corresponding numerical value is to be deducted from the next following notation when translating the entries into decimal values.

The apparatus shown in Figs. 2 to 7 serves to produce punched records as described in the foregoing. It is assumed that the apparatus according to Figs. 2 to 7 serves to operate periodically for recording the indications of an electric meter in intervals of one-quarter hour, for instance. An electric meter shown at "Z" (Fig. 2a) temporarily closes a pulse-transmitting switch 74 each time a predetermined number of armature revolutions is completed. Switch 74 is connected with a current source 74 between terminals $a$ and $b$ to which a relay 76 is connected. Each current pulse passing through relay 76 causes its armature 77 (Fig. 2) to impart one reciprocation to an angular lever 111 loosely journalled on a shaft 110. For clarity of illustration, the bearings for shaft 110 and for the other shafts mentioned below are not illustrated to avoid obscuring other parts of the mechanism. The armature 77 is linked to one arm 112 of the angular lever 111, whose other arm 113 (Fig. 3) is linked by a bar 114 with a corresponding counterarm (not visible) loosely journalled on the remote end of shaft 110. Journalled in the latter two arms is a shaft 216 (Figs. 2, 3) which carries three rigidly mounted pawls 133, 134, 135. The three pawls engage the teeth of respective stepping gears 136, 137, 138. Each stepping gear has at one peripheral spot a notch deeper than those at the other peripheral places. These deeper notches are denoted by 139, 140, 141 respectively. The depth of these notches and the positions of the pawls 133, 134, 135 on shaft 216 are so graduated that the pawl 134 during a stepping movement of the angular lever 111 can enter between the teeth of the stepping gear 137 only when the pawl 133 engages the deep notch 139. Similarly, the pawl 135 can enter between the teeth of the stepping gear 138 only when the pawls 133, 134, lie in notches 139, 140 respectively. As a result the so-called tens transfer is effected. That is, after ten progressive steps of the stepping gear 136 is the notch 139 reached by the pawl 133 so that during the tenth step of operation the pawl 134 can also turn the stepping gear 137 one step ahead. The next stepping movement of the latter gear occurs only when the gear 136 has travelled through ten further steps of operation. In the same manner, the gear 138 is shifted one individual step when the gear 137 has accumulated ten steps of operation. It follows that the gear 136 is stepped forward in accordance with the unit digit value, the gear 137 according to the tens value and the gear 138 according to the hundreds value of a decimal number.

At this point, it may also be explained how these stepping gears are again returned to the initial position. During resetting operation the shaft 110 performs one complete revolution. Firmly secured to this shaft are sleeves 148 (Fig. 3) with respective recesses 149 engageable by respective pawls 151. Each pawl 151 is urged into the recess 149 of the pertaining sleeve 148 by a leaf spring 153. Pawl 151 is revolvably mounted at 152 on the stepping gear 136 as well as on neighboring mechanism parts still to be described. In the initial position of stepping gear 136, the pawl 151 enters into the recesses 149 which is always at the same place except during the return movement. When the stepping gear 136 is being switched the pawl 151 moves out of this recess. If now, for resetting the counting mechanism, the shaft 110 is turned one full revolution, the non-recessed portion of sleeve 148 slides at first along the pawl 151. As soon as the pawl is reached by the recess, the pawl drops in and the stepping gear 136 is taken along into the initial position. The same device is provided for the stepping gears 137, 138. Consequently, all stepping gears can be returned to the initial position by imparting one full revolution of the shaft 110.

A return movement of the stepping gears is prevented by detents 142 which sit loosely on a shaft 145. The detent springs 217 abut at one end against the respective detents and at the other end against a fixed shaft 146. The carriers or bearings for shafts 145, 146 are omitted on the drawing for the reason mentioned previously.

Figure 4:
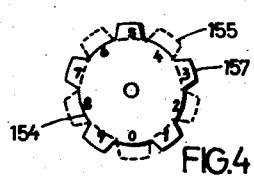
Figs. 4 to 7 are respective plan views of individual parts pertaining to the apparatus of Figs. 2 and 3.
Figure 5:
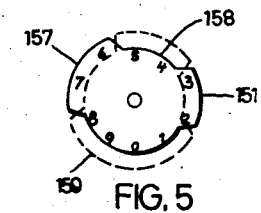
Figure 6:
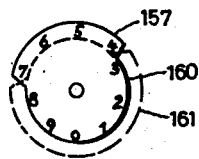
Figure 7:
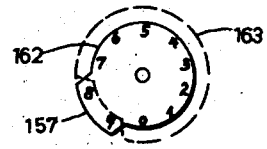
Figures 2, 2A:
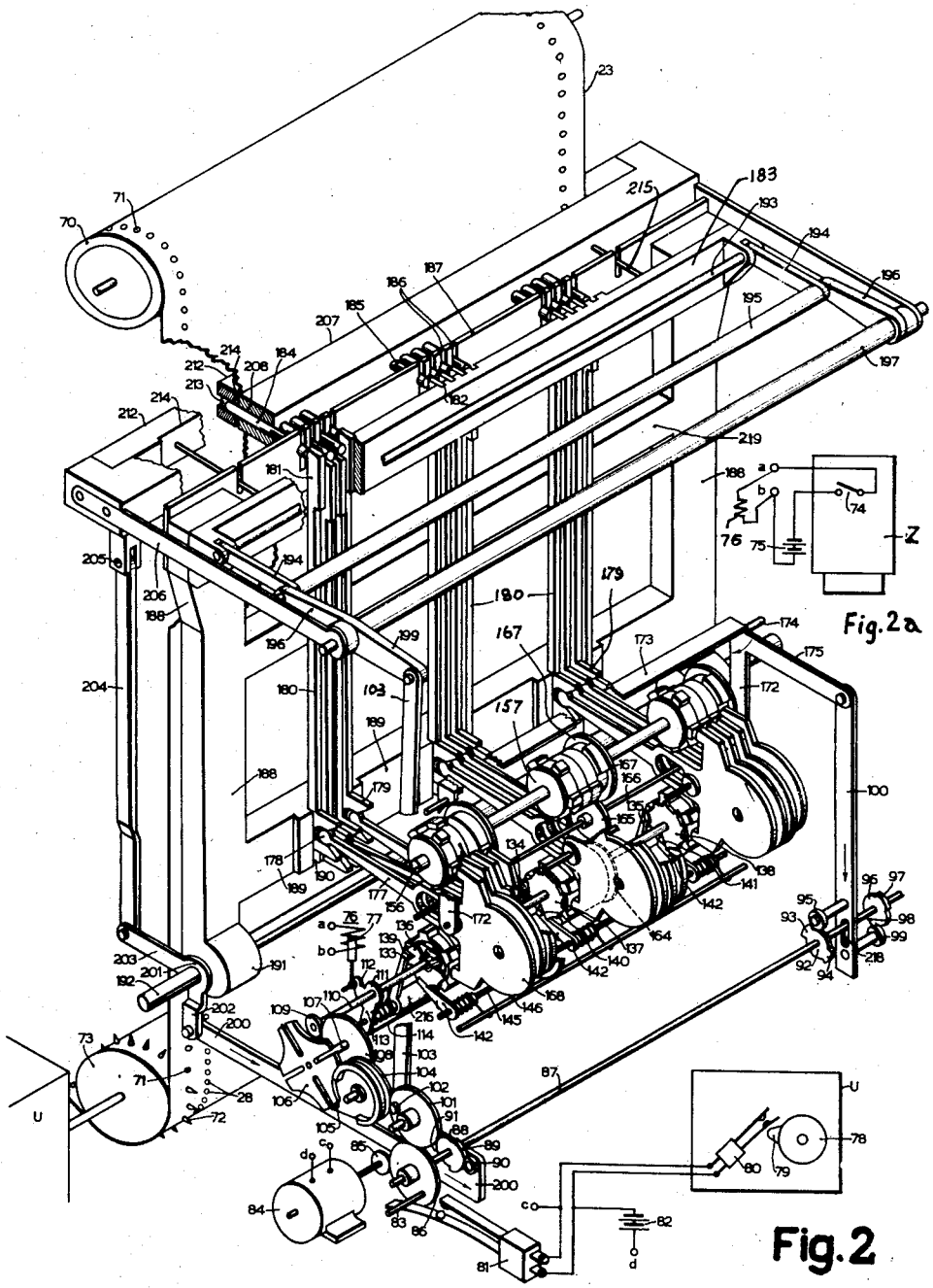
Fig. 2 shows in perspective a translating apparatus according to the invention for converting decimal values into punched multi-position binary notations on a tape as exemplified by Fig. 1.
Fig. 2a shows schematically an electric meter and relay circuit for controlling the apparatus of Fig. 2.
Figure 3:
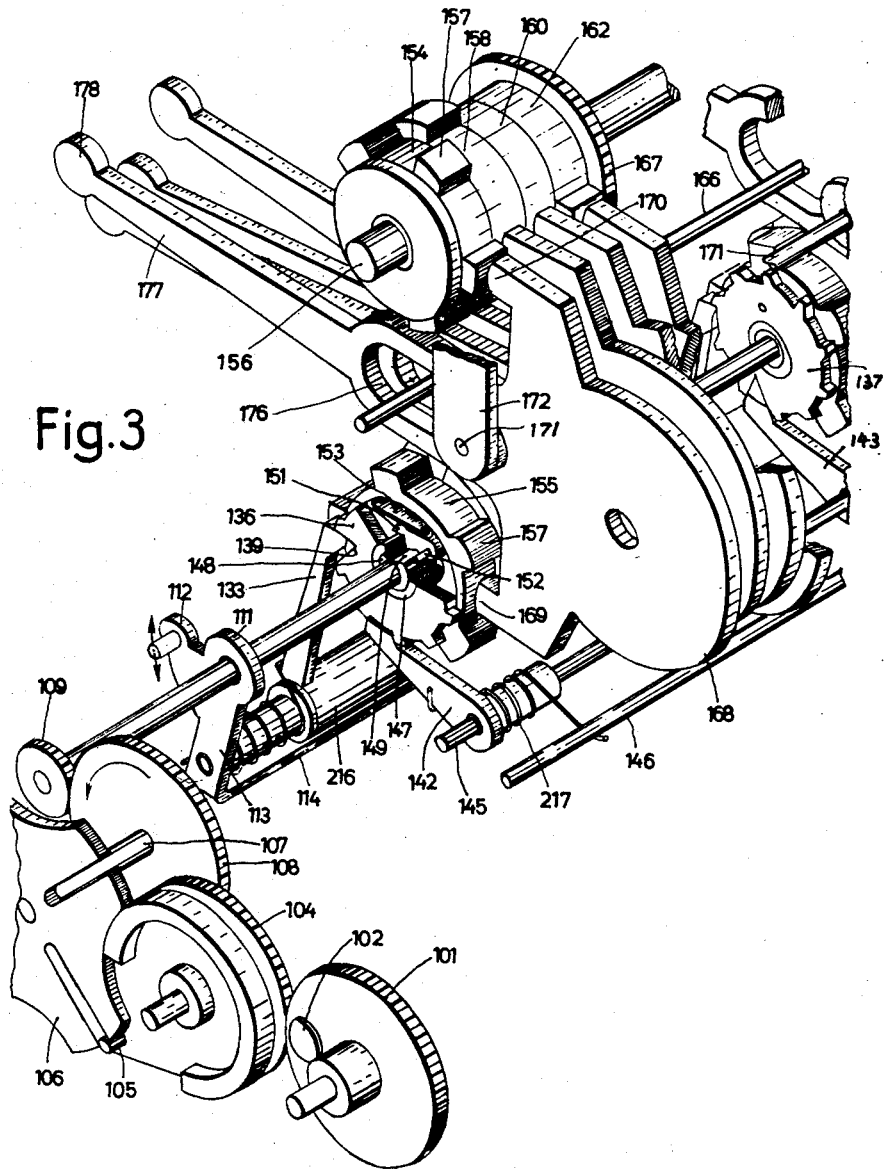
Fig. 3 is a perspective and enlarged view of a portion of the apparatus shown in Fig. 2.

Firmly joined with the stepping gear 136 are a cam disc 155 and three other discs 159, 161, 163 which are obscured by other parts in Figs. 2 and 3 and are therefore represented in Figs. 5 to 7 by broken lines. The cam disc 155, though visible in Figs. 2 and 3, is also represented in Fig. 4 by a dotted line. The shape and functioning of these cam discs will be explained in a later place. An exactly similar set of four cam discs is firmly connected with each of the additional stepping gears 137, 138 respectively. Also firmly connected with each of these sets is a spur gear 164 shown in Fig. 2 in broken lines. This gear 162 drives a spur gear 167 through an intermediate spur gear 165 (Figs. 2, 3). Spur gear 167 is connected with a similar set of cam discs 154, 158, 160, 162 (Fig. 3). These latter cam discs are represented in Figs. 4 to 7 by full lines. The set of gears comprising these cam discs as well as the spur gear 167 is loosely journalled on a shaft 156. The sets of gears are the same for all three decimal positions.

The shape of the cam discs will now be explained with reference to Figs. 4 to 7. In these figures the ten different rotary positions, corresponding to the respective steps of the cam rotation, are indicated by the numbers 0 to 9 respectively. The four cam discs of each cam assembly are correlated to the four positions of the binary system. The cam disc 154 thus is correlated to the noughth power, the cam disc 158 to the first power, disc 160 to the second and disc 162 to the third power of the value "2." Each of these discs has cam projections 157 at those places at which the corresponding power of the value "2" occurs during the translation of the numbers 0 to 9 into a binary system. Accordingly, the cam disc 154 for the unit values has cam projections in all odd step positions. The disc 157 has cams at the step positions 2, 3, and 6, 7, the cams of disc 160 are located at step positions 4 to 7 and those of cam 162 at positions 8 and 9. The cam discs 155, 159, 161, 163 have cams at all those places where the above-mentioned discs are free of cams. Hence, the discs 155, 159, 169, 163 represent, so to say, the negative or mirrored values of the first mentioned disc.

The above described cam discs serve to translate the progressive count of a decimal number into the mixed binary-decimal system.

The cam disc assemblies are scanned by respective groups of feeler members 168 (Fig. 3). The fingers 169 scan the negative cam discs, that is these fingers cooperate with the lower disc assemblies. The fingers 170 scan the positive cam disc, i. e. the upper disc assemblies. Each member 168 has an arm 167 with a circular end 178. When a finger 170 abuts against a cam 157 of the upper cam disc assembly, the arm 177 is lifted. Otherwise arm 177 remains in its lowered position. Only in the raised position of arm 177 is the recording tape punched at the place correlated to the corresponding cam disc, as will be explained in a later place. The shaft 166 passes through respective openings of the members 168.

The force for the stepping movement of the cam disc assemblies is provided only by the relay 76. To prevent the stepping movement of the cam disc assemblies from being hindered by the feeler members 168, these members are moved away from the cams as long as the assemblies are being stepped forward, for instance, during a recording period of the meter Z. Only shortly before and during the punching operation are the feeler members temporarily placed into the range of the cams. To this end the feeler members 168 are loosely journalled on a shaft 171. Shaft 171 is mounted in a fork shaped structure having legs 177 joined by a yoke portion 173. The fork structure is rockingly mounted on a shaft 173. The fork structure is only partially illustrated to prevent obscuring of other parts. Mounted on the fork structure is an arm 175 to which a rod 100 is pivotally connected. Rod 100 carries rollers 95 and 99 coacting with respective cam discs 92 and 96. The cam projections 93, 94 of disc 92 which extend over about one-quarter of a circle are displaced 90° relative to the cams 97, 98 of disc 96. Rod 100 is guided by means of an oblong hole traversed by the shaft 87. The bearing means for shaft 87 are omitted for the reason mentioned. During a full revolution of shaft 87, the feeler members 168 are twice moved toward and away from the cam disc assemblies.

The recording tape 23 passes from a supply roll 70 through a slit 214 between two parts 207 and 212 of a vertically displaceable frame structure. Feeding movement is imparted to the tape by means of a sprocket drum 73 driven by clockwork U. The sprockets 72 of drum 73 enter into corresponding holes 71 of the tape. The tape is shown in Fig. 2 with a considerably larger width than corresponds to the actual dimensions and proportions which are more accurately represented in Fig. 1. This distortion is necessary in Fig. 2 because the individual elements of the punching apparatus, for the purpose of illustration, are shown much more widely spaced apart than is the case in the actual apparatus.

The frame parts 207 and 212 have respective bores 208 and 213 which slidably accommodate a number of punch pins 184. The punch pins are flattened at 185 over part of their length. The flattened portions are movable in slots 168 of a comb plate 187. Each punch pin 184, at its end facing the observer, is engageable with a slider 181 guided in a groove 182 of a pressure bar 183. The sliders 181 form the extentions of respective rods 180 whose lower ends terminate into bifurcated heads 179. These heads straddle the circular end portions 178 of the respective arms 177 and are guided in grooves 190 of a crossbar 189. The crossbar 189 and another crossbar 219, together with two vertical limbs 188, form a frame which has two coaxial hubs 199 revolvably mounted on a shaft 192. Secured to this frame are also the comb plate 187 and the pressure bar 183. Linked to the frame by means of a shaft 193 are the one ends of two toggle-joints each composed of two links 194 and 196. The respective other ends of the toggle joints are pivoted on a shaft 197. Shaft 197 is mounted on two arms 205 firmly joined with parts 207 and 212. One of the toggle joint levers 196 has a rearward extension 199 linked by a rod 103 with a crank pin 102 of a spur gear 101. For clarity, the rod 103 is shown interrupted. The length of the punch pins 184 and the width of the sliders 181 in the axial direction of the punch pins are so adapted to each other that during the punching movement of the pressure bar 183, imparted thereto by the operation of the toggle joint levers 194 and 196, only those punch pins are forced through the paper tape 23 between whose ends and the pressure bar 183 a slider 181 is located at that time. If a slider 181 has dropped away from the corresponding punch pin, the pressure bar 183 cannot reach that particular pin so that no hole is punched into the tape at the corresponding spot.

Also guided in frame part 207 are punch pins 215 of smaller diameter which are directly engageable by the pressure bar 183 and serve for punching the holes 28 (see Fig. 1). The shaft 195 forms the toggle pivots for the toggle joint levers 194, 196. The frame parts 207, 212 in which the punch pins 184 are guided, are upwardly and downwardly movable relative to the pressure bar 183. To this end the parts 207, 212 are linked by the arms 206 to the shaft 198 journalled in the stationary housing or supporting structure of the apparatus. The parts 207, 212 are joined by pivots 205 and rods 204 with one arm 203 of an angular lever 201 rotatably mounted on the shaft 192. The other arm 202 of lever 201 is pivotally joined with a rod 200 which carries a roller 90 engaging a cam projection 89. The cam disc 88 is firmly mounted on a shaft 87. During a full revolution of shaft 87, the parts 207, 212 perform a reciprocating vertical movement.

A motor 84 has on its shaft a pinion 85 which drives a spur gear 86 with an eccentrically located dog pin 83. Disposed in the path of the dog pin is the contact member of a switch 81 normally biased to its closed position. Parallel connected with switch 81 is another switch 80 spring biased toward its open position. The switch 80 is periodically and temporarily closed by the cam 79 of a disc 78 driven by the above-mentioned clockwork U. The two switches 80 and 81 are connected to a current source 82. The terminals c and d of the switch circuit are connected with the respective terminals c and d of the motor 84.

The spur gear 86, firmly mounted on shaft 87, drives through the above-mentioned spur gear 101 a further spur gear 104 which carries a drive pin 105 for coaction with a Geneva gear 106. A shaft 107 connects the Geneva gear 106 with a spur gear 108 meshing with a spur gear 109 on shaft 110.

This concludes the description of the individual parts and subassemblies of the apparatus. The operation of the apparatus as a whole is as follows:

Assume that the stepping gear wheels 136 to 138 and the cam discs joined therewith are in the initial position at the start of a recording period. When responding to electric current consumption, the meter Z (Fig. 2a) issues pulses to the relay 76 by means of the pulse switch 74. Each pulse causes the relay 76 (Fig. 2) to impart one forward and return stroke to the angular lever 111. As a result the stepping gear 136 is moved forward by pawl 138 exactly one step for each pulse received by the relay. At that time, the pawls 134, 135, as explained, are not in active engagement with the respective stepping gears 137 and 138, and the feeler members 168 are lifted from the cam disc assemblies so that these assemblies are freely movable. After accumulating ten steps the pawl 133 reaches the deep notch 139 of stepping gear 136. Consequently the pawl 134 now engages the gear 137 and switches it one step forward. The same tens transfer repeats itself after each ten steps of operation. When a total of one hundred steps is reached, pawl 133 as well as pawl 134 enter into the corresponding deep notches 139, 140 with the result that the pawl 135 is also in active engagement with the pertaining stepping gear 138 thus advancing it one step. In the meantime, the clockwork U continuously advances the recording tape 23 by means of the sprocket drum 73.

At the end of the recording period, the cam 79 temporarily closes the switch 80 thus starting the motor 84. After dog pin 83 slides off the pertaining contact member of switch 81, this switch establishes a self-holding circuit for motor 84 during the rest of one full revolution of shaft 87. At the end of this revolution, the dog pin 83 reopens the switch 81. Since in the meantime the switch 80 has been released from the cam 79, the motor 84 is now disconnected and stops. The dog pin 83 is shown 90° displaced from its actual position to illustrate that it serves to open the switch 81. Actually, the dog pin 83 is 90° displaced relative to the cams 89, 93, 94 so that the pin, at the moment when the cams are in the illustrated positions, has already slid off the contact member of switch 81.

During the first quarter revolution of the shaft 87, the cam 89 engages the roller 90 and thus moves the rod 200 in the sense of the arrow Q into the illustrated position. This causes the angular levers 201 and the linking rod 204 to lower the frame parts 207 and 212 including the punch pins 184 a distance corresponding to the spacing of two adjacent holes 28 (see Fig. 1).

Shortly thereafter the roller 95 slides off the cam 94. This shifts the linking rod 100 in the direction of the arrow R to the illustrated position. The fork structure 172, 173 is thus turned in the direction of arrow R with the result that the feeler members 168 have their feeler fingers 169, 170 moved toward the cam disc assemblies 153 etc., 174 etc. Depending upon the position of the cams in the cam disc assemblies the feeler arms 177 are either lifted or left in their lowered position. Correspondingly, the sliders 181 are either lifted by the rods 180 or left in their lowered position. The lifted sliders 181 enter between the ends of the pertaining punch pins 184 and the pressure bar 183. Now the spur gear 10, acting through the pivot pin 102 and the linking rod 103, places the toggle joints 194, 196 into stretched position. This causes the pressure bar 183 to advance toward the punch pins 184, and the tape 23 is punched accordingly. The comb plate 184 participates in the punching movement. The frame 188, 189, 219 performs a rocking movement about shaft 192. The sliders 181 differ somewhat from one another in width, or the punch pins 184 have somewhat different respective lengths. Therefore, the holes are punched in a given sequence so that the power required for the punching operation is distributed over a given travel distance of the pressure bar 183 thus considerably reducing the power requirements of the motor 84.

During the second quarter revolution of the shaft 87, the cam 83 causes lifting of roller 95 and rod 100. The fork structure 172, 173 is thus rocked in opposition to the arrow R. The feeler members 168 with their fingers 169, 170 are shifted out of the range of the cam disc assemblies. In the meantime, the driver 105 reaches a slot of the Geneva gear 106 and turns this gear 90°. This imparts through the spur gears 108 and 109 one full revolution to the shaft 110, due to the fact that the transmission ratio between the gears 108 and 109 is 1:4. As described, the full revolution of shaft 110 causes all cam disc assemblies to return into the initial position.

During the third quarter revolution, the roller 90 has left the cam 89. Instead the cam 89 has engaged the opposite roller 91 so that the linking rod 200 is shifted in opposition to the arrow Q. As a result the parts 207, 212 are lifted, by the action of lever 201 and linking rods 204, a distance corresponding to the spacing between two adjacent holes 28. In the meantime, the roller 95 has slid off the cam 93. The rod 100 has again been lowered in the sense of arrow R so that the feeler members 168 with their fingers 169, 170 have approached the cam disc assemblies. Now the position of the cam disc assemblies is being scanned by the feeler fingers for the above-mentioned checking purposes. During the scanning operation the arms 177 and the sliders 181 are again displaced in the manner described in the foregoing. The toggle joints 194, 196, which during the continued revolution of the crank pin 192 were first folded upwardly and which prior to the lifting of parts 207, 212 have withdrawn the pressure bar 183 and have caused the comb bar 187 to also withdraw the punch pins 184 from the tape 23, are now returned downwardly into the stretched position. As a result, the initial position of the cam disc assemblies is punched into the tape 23 to serve as a checking reference. If, due to any trouble, the initial position is not reached, the discrepancy will be apparent from the punched entry to be considered when evaluating the punched record. The value-denoting punching operation is accompanied by the operation of the thinner punch pins 215 at the right and left hand margins of the tape 23. These punch pins 215 produce the abovementioned marginal holes 28 which serve to secure a correct feeding movement of the tape 23 during the subsequent evaluation or retranslating operation.

During the fourth quarter revolution, the roller 95 is lifted by the cam 94. This causes the feeler members 168 to be removed from the range of the cam disc assemblies. Eventually the motor 84 disconnects itself, as mentioned, by opening the self-holding switch 81. Before this occurs the crank pin 102 folds the toggle joints 194, 196 downwardly thereby withdrawing the punch pins 184 and 215 from the paper tape 23.

In the next following recording period, the above-described operations are repeated. That is, the meter Z by issuing electric pulses causes the cam disc assemblies to incrementally advance and to initiate the punching performance.

If such punching apparatus serve to produce a record of the power consumption in a large power distribution station, each individual value-denoting hole punched into the recording tape may represent an appreciable amount of money. It is therefore necessary to provide for utmost reliability of operation. As mentioned, a check upon the correct operation of the apparatus is afforded by the fact that for each value-denoting record the initial position of the cam disc assemblies is also punched into the tape. An additional security is afforded by virtue of the fact that the apparatus for its operation does not rely upon spring forces, springs being used only as biasing elements for the pawls while all movable mechanism parts are guided for fully constrained motion. For instance, the feeler fingers 170 are not held against a single cam disc assembly by the action of a biasing spring, but each feeler unit comprises two feeler fingers 169, 170 coacting with two respective cam disc assemblies with positive and negative cam profiles. Similarly, the operation of the cam control devices 92 to 99 and 88 to 91 is kinematically fully constrained. During the recording period the shaft 110 is blocked in a definite position by the Geneva gear mechanism 104 to 106. In order to avoid introducing complications into the feed of the tape 23, the tape is continuously advanced by a clockwork and, for separately punching of the value-denoting end positions and the initial positions of the cam disc assemblies, the punching device proper is lifted and lowered.

Aside from this utmost reliability of operation, the apparatus is also favorably distinct in that the cam disc assemblies and the parts of the feeler mechanism are all composed of entirely flat parts, preferably punchings, which are stacked onto one another. For that reason, these parts can be accommodated within a relatively small space. For facilitating the manufacture by punching of the cam discs 154 etc., each disc may be formed of a stack of thinner metal sheets so that, for instance, each individual cam disc consists of four identical punchings. To require an only small drive motor and for avoiding high stresses on the individual mechanism parts, the holes are preferably punched in a predetermined succession as explained previously. This permits giving the entire apparatus a smaller overall size than otherwise applicable. As also explained a free adjusting movement of the cam disc assemblies is secured by having these assemblies only temporarily scanned and having the correlated feeler fingers removed from the range of the cams during the remaining time.

While in the illustrated embodiment, the positions within the individual decimal zones of the recording tape are punched so as to result into a positive type of markings, it is also possible to punch those places that are not to denote values so that the record represents a negative or inverse representation of the number to be indicated. If it is desired to prevent subsequent forgeries or other falsification of the markings, a positive and a negative type of record may be combined with each other. Instead, two or more tapes may be punched simultaneously and these tapes may be passed through the punching apparatus in respectively different positions. This may also be used for providing the consumer as well as the supplier, or any plurality of parties involved in the transaction, with respective copies of the record.

The marking or punching apparatus may be provided with a power source independent of the power-line network under observation so as to prevent an interruption of the recording operation due to temporary failure of the line voltage. As a rule, it suffices to normally energize the recording apparatus from the line as long as line voltage is available and to store only an amount of energy sufficient to secure, in the event of voltage failure, a continued recording operation up to and including the next punching of the periodic value to be recorded and also sufficient to ascertain a proper feeding movement of the record tape.

As mentioned, punched tapes of the type marked in apparatus according to the above-described embodiment can be read off with relatively little effort. However, in most cases, it is also necessary to mechanically retranslate the mixed decimal-binary record back into decimal numbers, for instance, in order to transfer the recorded values to a calculating machine in which the punched notations of several recording tapes may be totalized. However, according to another embodiment of the invention, one and the same retranslating apparatus may serve for converting the binary-decimal records back into decimal numbers and for jointly performing the necessary calculating or totalizing operation. Such an apparatus is described in the following with reference to Figs. 8 to 11.

Figure 8:
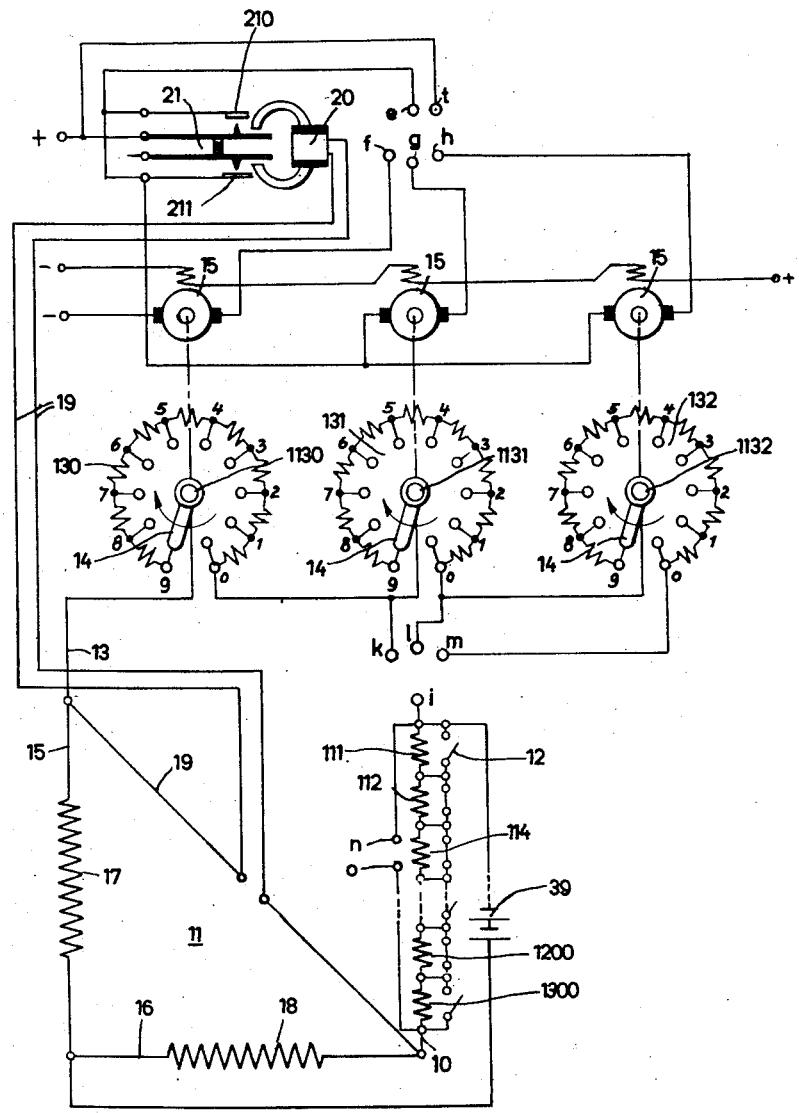
Fig. 8 illustrates diagrammatically an apparatus for retranslating multi-position binary values, such as represented on the tape of Fig. 1, into decimal values.
Figure 9:
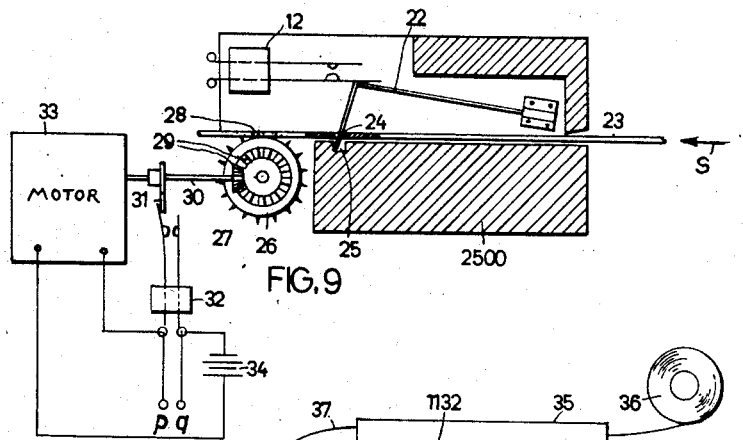
Figs. 9 and 10 show parts pertaining to the apparatus according to Fig. 8, Fig. 9 representing a feeler device to cooperate with the punched tape and Fig. 10 a calculating machine operating according to the decimal system.
Figure 10:
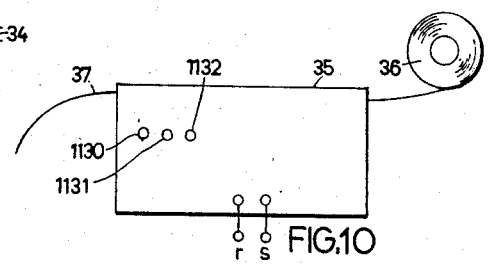
Figure 11:
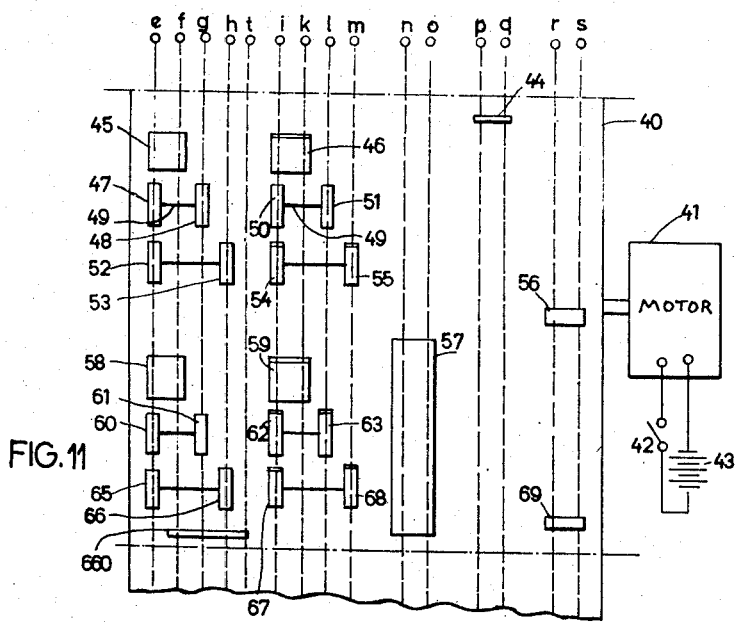
Fig. 11 illustrates schematically a control device including a control contact drum shown in developed form.

Figs. 8 to 11 represent one and the same apparatus, the electric terminals denoted by lower case letters in Fig. 11 being connected with the respective equally denoted terminals in Figs. 8 and 9.

According to Fig. 9, the punched tape is longitudinally moved along feelers 22 by means of a sprocket drum 26. The movement is stepwise. The number of the feelers is equal to the total number of the longitudinal rows of punched holes that represent the final adjustment of the above-described cam disc assemblies and hence, the numerical value to be reproduced. Consequently, for a tape according to Fig. 1 a total of eleven feelers 22 is required, one being assigned to each of the respective marking positions. For accuracy of operation, the sprockets 27 of drum 26 enter into the holes 28 that are punched into the tape when punching the indicated values and the initial positions of the cam disc assemblies. The sprocket drum 26 is driven by a motor 33 through gears 29 and a shaft 30. Shaft 30 carries a control cam 31 for opening a normally closed control switch 32. Parallel connected to this switch are two terminals $p$, $q$ pertaining to a control drum shown in Fig. 11 in developed form. The motor 33 is energized by a suitable current source 34.

When a value-denoting hole 24 registers with the feeler 22, then the free end of the feeler passes through the hole 24 into a groove 25 of a guide body 2500 for the tape 23. At the same time, a pertaining switch 12 is permitted to open. If the end of feeler 22 does not register with a hole, the feeler is lifted sufficiently to keep switch 12 closed against its opening bias.

As apparent from Fig. 11, switch 12 when closed shorts a resistor 111 which is series connected with a number of resistors equal to the number of feelers. Some of these other resistors are denoted by 112, 114, 1200, 1300. Each of the other resistors has a shunt-connected switch corresponding to the switch 12 and controlled by the pertaining one feeler. The resistor 111 is assigned to the last position of the binary numbers for the unit digit zone of the decimal system. If the size of this resistor is taken as unity, the next following resistor 112 has the value 2, the next following resistor 114 the value 4 and so forth. The last two resistors 1200 and 1300 of the series have the values 200 and 400 respectively. Since each time the short circuit of any particular resistor is eliminated only when a punched hole is in registry with the feeler, the punched value is correctly represented by the then effective total value of series resistance.

The resistors 111 to 1300 are connected in one of the branches 10 of a bridge circuit 11 (Fig. 8). An adjacent branch 13 of the bridge circuit is provided with series-connected stepped resistor devices 130, 131, and 132. The two remaining bridge branches 15 and 16 contain respective resistors 17 and 18. Connected in the bridge diagonal 19 is the coil of a polarized relay 20 which controls the movable member of a switch 21 with stationary contacts 210, 211.

The resistance of the stepped resistor devices 130, 131, 132 is incrementally adjustable by the rotary displacement of pertaining contact arms 14. The arms 14 are mounted on shafts 1130, 1131 and 1132 respectively. Each shaft is drivable by one of three respective motors 15. One step of resistor device 131 is ten times as large as one step of resistance device 132, and one step of resistance device 130 is ten times as large as one step of device 131. Accordingly, the resistance device 130 represents the hundreds, device 131 the tens and device 132 the units of that decimal number into which the punched notation is to be converted.

The shafts 1130 and 1132 lead to a calculating machine 35 (Fig. 10) which prints the resulting decimal number onto a paper tape 37 wound off a supply reel 36. The pertaining printing mechanism is actuated by the closing of an electric circuit between the terminals $r$ and $s$. Such calculating machines are known as such and for that reason need not be illustrated and described more in detail in this specification. Of course, the mechanical shafts 1130 and 1132 may be replaced by electric devices such as pulse transmitting conductors, cables or the like in the customary manner, depending upon the type of the calculating machine to be used.

The motors 15 are controlled by circuits connected to the terminals $e$ to $h$ and $t$ of the drum controller shown in Fig. 11. The resistance devices 130 to 132 are controlled through circuits connected with the terminals $i$ to $m$ of the same drum controller. In addition, a shorting circuit with contact terminals $n$, $o$, also controlled by the drum controller, is provided for coaction with the series-connected resistors 111 to 1300 (Figs. 8, 11).

The control drum 40, shown developed in Fig. 11, is continuously driven by a motor 41 which is energized from a suitable current source schematically represented at 43 and is started by the closing of a control switch 42.

The apparatus operates as follows. At first the contact segment 44 of drum 40 (Fig. 11) temporarily closes the circuit between terminals $p$ and $q$. Motor 33 (Fig. 9) starts running. Shortly thereafter, the cam 31 moves off the controlled contact member of switch 32, which now closes a self-holding circuit for motor 33 and keeps it closed until one full revolution of shaft 30 is completed. For each full revolution of shaft 30, the punched tape 33 is fed forward in the direction of the arrow S an amount equal to twice the spacing between the holes 28. The tape 23 is so inserted that after each step of advancing movement a value-denoting notation lies beneath the ends of the feelers 22. At the end of the advancing step, motor 33 is stopped due to the opening of switch 32.

Now the punched value is exactly represented by the total resistance of the resistor in the bridge branch 10 as explained. Shortly thereafter the drum segment 46 (Fig. 11) bridges the terminals $i$ and $k$. This inserts the resistor device 130 into the bridge branch 13, the resistor devices 131, 132 remaining at first disconnected. Subsequently, the drum segment 45 bridges the terminals $e$, $f$ and thus places voltage upon the motor 15 of resistance device 130 through the switch 21.

The subsequent operations will be more readily understood in conjunction with a concrete example. Assume that, at the moment under observation, the punched entry then being scanned corresponds to the decimal number 367 underlined by a broken line in Fig. 1. The resistors not shorted in bridge branch 10 (Fig. 8) have a resistance value proportional to this number 367 and the bridge circuit 11 will therefore become balanced only if eventually the resistance devices 130 to 132 have also a total resistance proportional to the same numerical value. At first, however, the resistance value 367 in branch 10 occurs simultaneously with a resistance value 900 in branch 13. Consequently, the bridge diagonal 19 is not deenergized but carries an unbalance current. Relay 20 responds to that current and places the switch member 21 into engagement with the stationary contact 210. This energizes the motor 15 for the resistance device 130. The pertaining arm 14 rotates clockwise and passes sequentially through the steps 8 to 4 until it reaches the step 3. The resistance value 130 on step 3 is 300 and hence is now smaller than the value 367. Consequently, the balance condition of the bridge circuit is overshot and the bridge is now unbalanced in the opposite sense. Hence the current in bridge diagonal 19 reverses its direction. The polarized relay 20 accordingly reverses the switch member 21 into engagement with the stationary contact 211. This disconnects the armature of the previously operating motor 15 from its energizing line and short circuits this armature. The resulting locked-rotor condition instantaneously brakes the motor to standstill. The arm 14 therefore stops on step 3 of resistance device 130. Thus, the hundreds value of the number 367 to be reproduced is determined and at the same time this value is introduced into the calculating machine 35 (Fig. 10) by means of the shaft 1130 (Figs. 8, 10).

Shortly thereafter the drum segments 45, 46 become disconnected from terminals $e$, $f$, and $i$, $k$ (Fig. 11), and the segments 50 and 51, interconnected by a lead 49, now close a circuit between terminals $i$, $l$. This switches the resistance device 131 into the bridge branch 13. Then the segments 47, 48 bridge the terminals $e$, $g$ thereby energizing the motor of the resistance device 131. At this stage, the bridge branch 13 has a total resistance of 390 which is larger than the resistance value of 367 effective in branch 10. Consequently, the relay 20 now places the movable contact 21 into engagement with the stationary contact 210 and energizes the motor 15 for the resistance device 131. The pertaining contact arm 14 successively passes through the steps 9 to 7. As soon as the arm reaches step 6, corresponding to the resistance value 360, the bridge becomes unbalanced in the opposite sense because 360 is smaller than the resistance value 367 in branch 10. The current in the polarized relay 20 reverses and the motor for resistance device 131 is disconnected and shorted. Now the value of the tens digit of the decimal number is determined and is entered into the calculating machine 35 by the shaft 1131.

Subsequently, the segments 47, 48, 50, 51 open the above-mentioned control circuits and the segments 54, 55 bridge the terminals $i$, $m$. This switches the resistance devices 132 into the bridge branch 13 so that this branch has now the resistance value 369. Then the drum segments 52, 53 bridge the contacts $e$, $a$, thereby starting the motor 15 for the resistance device 132. The switch arm 14 of this device now travels successively through steps 9 to 7. When step 7 is reached, the resistance value in respective bridge branches 10 and 13 are exactly equal or proportional. Hence, the current in bridge diagonal 19 drops to the zero value so that the coil of relay 20 is deenergized and permits the movable contact 21 to assume its neutral position in which it is disengaged from contact 211 and just touches the stationary contact 210. This condition in the neutral position of the relay can readily be secured by a corresponding adjustment of the relay contacts. The motor 15 for the resistance device 132 is now disconnected and shorted. Consequently, the unit value of the decimal number is now determined and is fed into the calculating machine 35 by the revolution of shaft 1132. Thereafter, the drum segments 52 to 55 leave the pertaining contact fingers of the drum contact and the segment 56 now temporarily closes the circuit between terminals $r$ and $s$. This places the printing device of the calculating machine into operation so that the number 367 is printed upon the tape 37.

The subsequent switching operations return to the resistance devices 130 to 132 to the initial position, i. e. to step 9. For this purpose the control segment 57, through terminals $n$ and $o$, shorts all resistors in branch 10 so that the total resistance value of this branch becomes zero. Thereafter the segments 59, 58 bridge the terminals, $i$, $k$ and $e$, $f$. This switches the resistance device 130 into the bridge branch 13 and puts the pertaining motor 15 in operation. Since now the resistance device 130 is initially adjusted to step 3, thus having an effective resistance larger than zero, the pertaining arm 14 advances clockwise down to zero. As a result the relay 20 becomes deenergized and the drive motor of rheostat 130 is disconnected and braked. The same operation occurs with the aid of drum segments 60 to 63 for the rheostat 131 which likewise returns to zero. Eventually, the rheostat 132 is similarly reset to zero under control by the segments 65 to 68. Finally, the control segment 600 which connects the terminals $f$, $g$ and $h$ with terminal $t$ passes current temporarily through all three motors 15, the switch 21 then being shorted, so that all three arms 14 advance from step zero to step 9. Before this last step occurs, the segment 69 effects another printing operation of the calculating machine 35 through the terminals $r$, $s$. Consequently, the zero position of the rheostat arms is indicated on the tape by a series of printed zeros for checking purposes as explained. Subsequently, the segment 44 again bridges the terminals $p$, $q$. This causes the tape 23 to be advanced one step. From then on the above-described sequence of operations is repeated for the new number then represented by the value-denoting holes of line then being scanned.

If it is desired to totalize the simultaneous punched records of several tapes with the aid of the resistance bridge, then the guide body 250 (Fig. 9) is to be equipped with several sets of feelers corresponding to the number of tapes to be simultaneously processed. The resistors controlled by the additional sets of feelers are series connected with the resistors 111 to 1300 in the bridge branch 10. In this manner the punched entries of a multiplicity of tapes can be totalized and the calculating machine 35 then prints the totalized sum. If the indications of one tape are to be subtracted, then the set of resistors controlled by the feelers for this one strip are inserted in the bridge branch 13. This makes it possible, for instance, to determine the periodic current consumption of a large area having numerous power supply and power takeoff points provided with respective recording devices according to Fig. 2.

If the punched value of a tape is not equal to the measuring unity for the electric power consumption but must be multiplied with a given factor for yielding the consumption value in the desired units, then this factor can be adjusted by changing one of the resistors 17, 18 of the bridge circuit 11. The necessary multiplication is then automatically effected within the record-retranslating and evaluating apparatus. Another possibility affording the same result is to assign to the different longitudinal rows or positions of the recording tape respectively different and properly adapted sets of resistors 111 to 1300. For similar reasons longitudinal rows or positions denoting respectively different values of the punched holes may also be algebraically totalized with the aid of the bridge circuit 11.

It will be recognized therefore that for the retranslation of the mixed decimal-binary records into a decimal number according to the illustrated embodiment it is essential that the record is first converted into a resistance in one branch of a bridge circuit and that this resistance is measured by means of decimally stepped resistors in a counter-balancing branch of the same bridge circuit. This permits retranslating the mixed-code number into a decimal number with relatively simple and reliable devices of only moderate cost.

It will be obvious to those skilled in the art upon a study of my disclosure that the invention permits of various modifications and may be embodied in apparatus other than those specifically illustrated and described, without departing from the essence of my invention and within the scope of the claims annexed hereto.

I claim:

1. Apparatus for recording decimal magnitudes, comprising tape-accommodating means, a plurality of groups of tape-marking devices having in each group a plurality of less than ten marking devices operative in accordance with a given multi-position code, the number of said groups being in accordance with that of the decimal digits of the magnitudes to be recorded and said groups being aligned in accordance with said digits, a counter mechanism adjustable in response to an input magnitude to be recorded and having for each of said groups a plurality of members and digit transfer means intercoupling said members, and connecting mechanisms selectively joining said members with said respective marking devices in accordance with said code, whereby the tape is marked with successive code groups of marks groupwise corresponding to the respective decimal digits of the input magnitude.

2. Apparatus for recording decimal magnitudes, comprising tape-accommodating means, a plurality of groups of tape-marking devices having in each group a plurality of less than ten marking devices operative in accordance with a given multi-position code, the number of said groups being in accordance with that of the decimal digits of the magnitudes to be recorded and said groups being aligned in accordance with said digits, a decimal counter mechanism adjustable in response to an input magnitude to be recorded and having for each of said groups a plurality of members and tens transfer means intercoupling said members whereby said members for each group are adjusted in accordance with the respective digit values of said magnitudes, control members connected with said respective counter members and being adjustable together therewith, each of said control members having a control element occupying a given reference location when the decimal value to which the pertaining counter member is adjusted corresponds to a position value in said code, and control means responsive to said control elements in said reference location and linking said elements with said respective marking devices for controlling said devices to mark the tape.

3. Apparatus for recording decimal magnitudes, comprising for each full decimal digit of the range of magnitudes to be recorded a coding device disposed for translating the decimal digit value into a four-position binary code and having four output members for the respective four binary positions and denominational-position transfer means sequentially linking said four members with each other, record-sheet accommodating means, a plurality of groups of marking devices correlated to said means for marking the sheet element, each group having a marking device for each of the four code positions, and mechanisms linking said marking devices of each group with one of said respective coding devices for controlling said devices to mark the sheet, said groups of marking devices being aligned in accordance with the digits of the decimal magnitudes to be recorded.

4. Apparatus for recording decimal magnitudes, comprising tape-accommodating means, a plurality of groups of tape-marking devices having in each group a plurality of less than ten marking devices operative in accordance with a given multi-position code, the number of said groups being in accordance with that of the decimal digits of the magnitudes to be recorded and said groups being aligned in accordance with said digits, a decimal counter mechanism adjustable in response to an input magnitude to be recorded and having for each of said groups a plurality of members and tens transfer means intercoupling said members whereby said members for each group are adjusted in accordance with the respective digit values of said magnitudes, cam members joined with said respective counter members to be adjusted together therewith, movable feelers, each cam member having a cam engageable with one of said respective feelers when the decimal value to which the pertaining counter member is adjusted corresponds to a position value in said code, and mechanisms linking said feelers with said respective marking devices for controlling said devices to mark the tape.

5. Apparatus for recording decimal magnitudes, comprising for each decimal digit of the range of magnitudes to be recorded a coding device for translating the decimal digit value into a multi-position code of less than ten code positions, said coding device having a first set of cam members for the respective code positions and having position-transfer means interconnecting said cam members, said coding device having a second set of cam members correlated to said respective cam members of said first set and adjustable together therewith, said cam members of said first set having cams occupying a given reference location when the decimal digit value to which the coding device is adjusted corresponds to a position value in said code, said cam members of said second set having cams occupying a given reference location when said decimal digit value does not correspond to a position value in said code, said coding device having movable feelers each having two fingers engageable with two correlated cams respectively of said two sets to be jointly controlled thereby accommodating means for a record-receiving sheet element, a plurality of groups of marking devices correlated to said means for marking the sheet element, each group having a marking device for each of the respective code positions, and mechanisms linking said marking devices with said respective feelers for controlling said marking devices to mark the sheet element in said multi-position code.

6. Apparatus according to claim 4, comprising a lifting device engageable with said feelers for selectively moving them into and out of engageable position relative to said cam members.

7. In apparatus according to claim 4, said marking devices comprising respective punch pins disposed parallel to one another, a movable punch pressure structure, coupling elements disposed selectively coupling said pins with said structure to then impart punching movement to the pins, said coupling elements forming part of said mechanisms to be controlled by said feelers.

8. In apparatus according to claim 4, said marking devices comprising respective punch pins disposed parallel to one another, a pressure bar extending along said pins in spaced relation thereto and being movable toward said pins, sliders selectively movable into the space between said bar and said respective pins for imparting punching movement from said bar to selected ones of said pins, said sliders forming part of said mechanisms to be controlled by said feelers respectively.

9. Apparatus for recording decimal magnitudes, comprising tape-accommodating means, a plurality of groups of tape-marking devices having in each group a plurality of less than ten marking devices operative in accordance with a given multi-position code, the number of said groups being in accordance with that of the decimal digits of the magnitudes to be recorded and said groups being aligned in accordance with said digits, a decimal counter mechanism adjustable in response to an input magnitude to be recorded and having for each of said groups a plurality of members and tens transfer means intercoupling said members whereby said members for each group are adjusted in accordance with the respective digit values of said magnitudes, cam members joined with said respective counter members to be adjusted together therewith, movable feelers, each cam member having a cam engageable with one of said respective feelers when the decimal value to which the pertaining counter member is adjusted corresponds to a position value in said code, and mechanisms linking said feelers with said respective marking devices for controlling said devices to mark the tape, reset means joined with said counter mechanism for resetting it to an initial counting position, and control means connected with said pressure structure and with said reset means for causing said pressure structure to perform two punching movements when said counter mechanism is adjusted to the magnitude to be recorded and when said counter mechanism is reset, respectively.

10. Apparatus for recording decimal magnitudes, comprising tape-accommodating means, tape punching means having as many groups of parallel punch pins as the respective magnitudes to be recorded have digits, each group having a plurality of up to five of said pins in accordance with the denominational positions of a given code, said pins being all aligned and said group following each other in accordance with the digital sequence of the decimal magnitude, a pressure bar extending behind said pins in spaced relation thereto and being reciprocable toward and away from said pins, drive means linked with said bar for imparting reciprocatory movement thereto, a decimal counting mechanism adjustable in accordance with the magnitude to be recorded and having for each of said groups as many digital counter members as the respective groups have pins, said counter members having respective cam members of a cam design corresponding to said code, movable feelers engageable with said respective cam members and displaceable thereby, coupling elements joined with said respective feelers and movable between said bar and said respective pins for selectively imparting punching movement from said bar to said pins depending upon the cam responsive movement of said respective feelers, a reset device joined with said counting mechanism for returning it to an initial position, and periodic control means connected with said pressure-bar drive means for actuating said bar twice in predetermined intervals of time, said control means being also connected with said reset device for actuating it between said two actuations of said bar.

11. In apparatus according to claim 10, said pressure bar drive means comprising a knee-action toggle joint mechanism linked to said bar, and a crank drive linked with said toggle joint and having two crank rotations for each actuation so as to move said toggle joint twice into stretched position for twice moving said bar toward said pins.

12. In apparatus according to claim 10, said tape accommodating means comprising tape feed means connected with said control means for advancing the tape between said two actuations whereby the recorded magnitude and thereafter the initial position of said counting mechanism are punched on separate lines of the tape.

13. Apparatus according to claim 10, comprising additional punch pins engageable by said pressure bar during each punching stroke of said bar for punching guide holes into the tape.

14. In apparatus according to claim 10, said feelers and coupling elements as well as said punch pins and said pressure bar being all linked with the pertaining driving elements in a kinematically constrained junction therewith.

15. In apparatus according to claim 10, said periodic control means comprising a drive shaft, an electric motor connected with said shaft, and periodic switching means electrically connected with said motor for energizing it in given intervals of time for a given amount of revolution of said shaft.

References Cited in the file of this patent

UNITED STATES PATENTS

| | | |
|---|---|---|
| 835,901 | Collet | Nov. 13, 1906 |
| 1,141,962 | Irion et al. | June 8, 1915 |
| 2,323,824 | Maschmeyer | July 6, 1943 |
| 2,435,725 | Paris | Feb. 10, 1948 |
| 2,575,034 | Tyler et al. | Nov. 13, 1951 |
| 2,580,768 | Hamilton et al. | Jan. 1, 1952 |